Figure 1B:
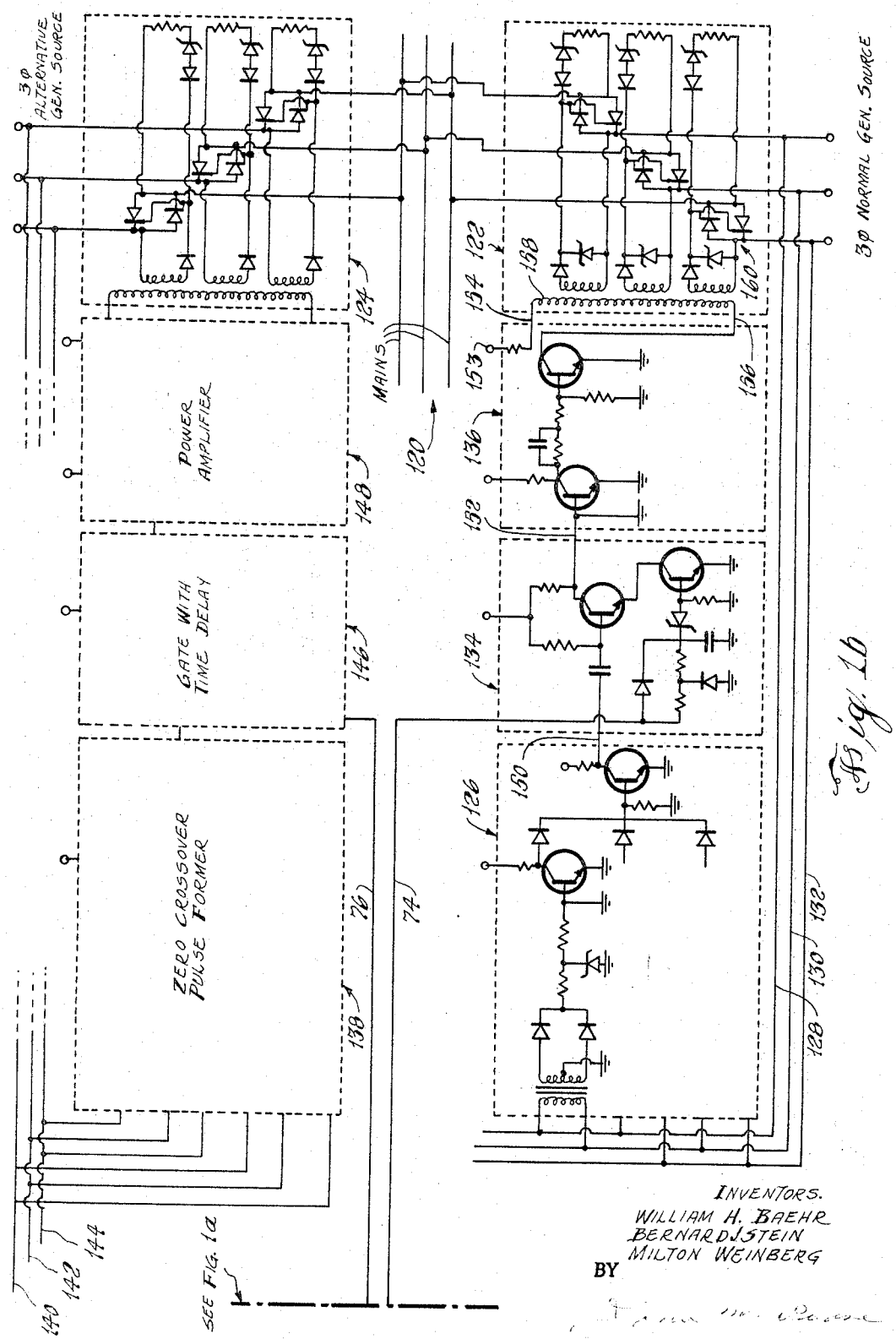

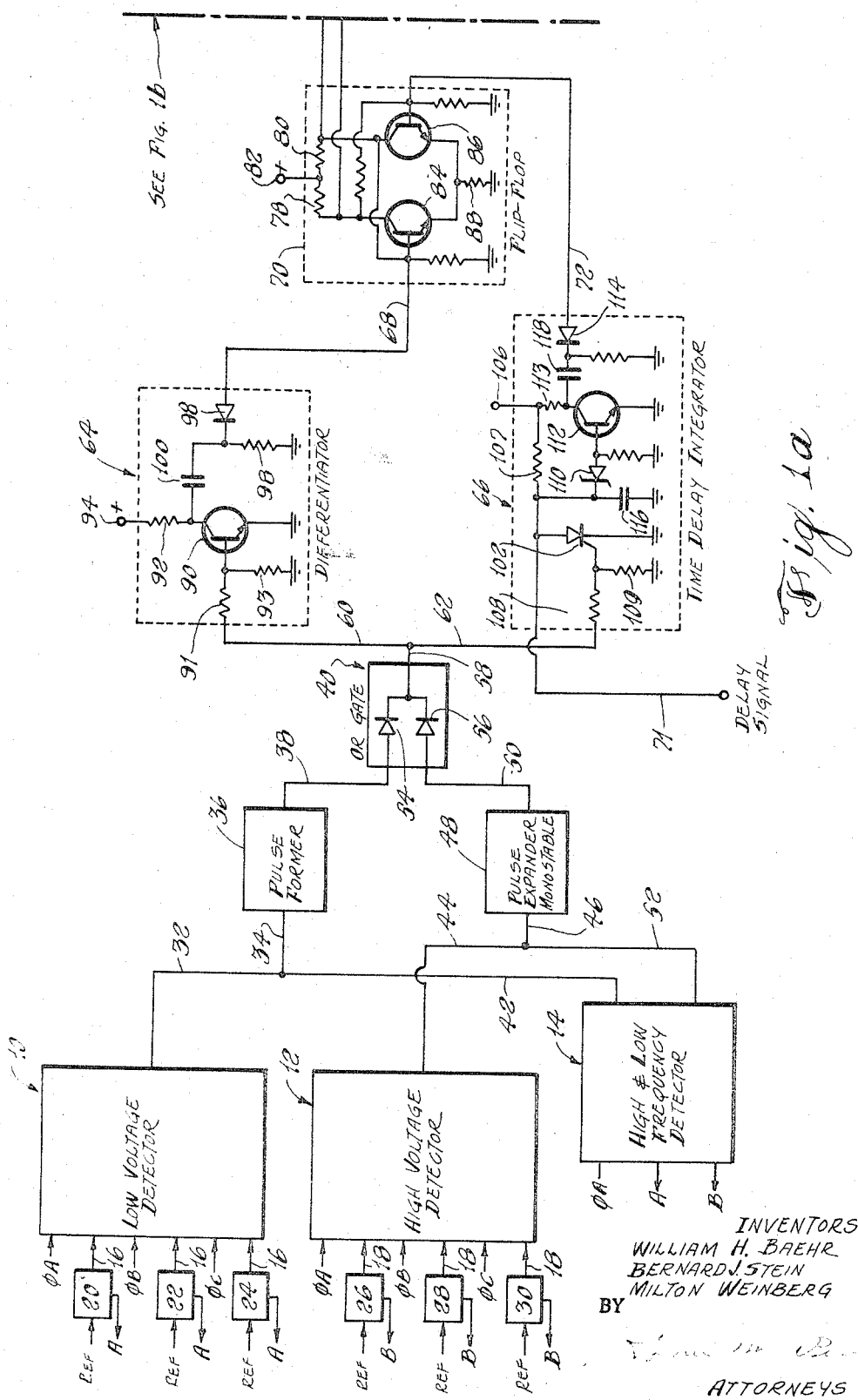

INVENTORS.
WILLIAM H. BAEHR
BERNARD J STEIN
MILTON WEINBERG
BY

ATTORNEYS

United States Patent Office 3,337,742
Patented Aug. 22, 1967

3,337,742
POWER SUPPLY MONITOR AND BUS TRANSFER SWITCH
William H. Baehr, Uniondale, Bernard J. Stein, Jamaica, and Milton Weinberg, Plainview, N.Y., assignors, by mesne assignments, to the United States of America as represented by the Secretary of the Navy
Filed Apr. 20, 1965, Ser. No. 449,659
6 Claims. (Cl. 307—64)

This invention relates to a high speed condition responsive electronic control circuit for automatically transferring an auxiliary alternating current generator to load mains responsive to a fault in voltage or frequency condition of a normal alternating current generator serving the mains and for transferring service back to the normal generator responsive to elimination of the fault condition.

The term high speed as herein contemplated is intended to mean that the detection of fault and the function of changeover must take place in a matter of a few milliseconds and within two cycles operating time. For example, with a normal 400 cycle supply the detection and changeover must take place within 5.0 milliseconds.

Power switch means providing the speed of power transfer indicated above is particularly useful where power is being supplied to ships intertial navigation system wherein variation in voltage or frequency cannot be tolerated for the time necessary for conventional switching without developing malfunction of the navigational system.

Conventional mechanical relay controlled switches are too slow to accomplish the above results.

In accordance with applicant's invention, it is an object to provide condition responsive electronic control means to provide switching within the high speed time limit mentioned above and to provide fault sensing circuits operable within the same time limits.

A further object of the invention is to provide means for automatically transferring the mains back to the normal generator supply upon the elimination of fault in the normal generator.

A still further object is to provide means for varying the fault tolerance limits subsequent to fault, such that a more rigid tolerance is employed in indicating lack of fault for re-connection of the normal generator to prevent hunting.

Another object is to provide in such a condition responsive circuit time delay means for sequential switching of the generators.

A further object is to provide improved high speed low voltage detector means.

Another object is to provide improved high speed frequency detector means.

The above and other objects and advantages of the invention will be apparent to those skilled in the art from reading the following disclosure describing one exemplary embodiment of the invention and from reference to he drawings in which:

FIGS. 1a and 1b are schematic diagrams partially in block form of one system embodying the invention.

In general, applicants' invention comprises separate on-off high speed static switch means and associated control circuits for alternatively connecting normal and an alternate generator source to common load mains, high speed voltage and frequency detection means for sensing the condition of the normal generator source and developing continuous pulse signals responsive abnormal voltage and/or frequency condition, a flip-flop circuit connected to the switch control circuits to control the on-off condition of the switch means dependent upon the condition of said flip-flop, and differentiator and integrator circuits connected to condition the flip-flop to open the normal generator switch means and close the alternator switch means responsive to said fault pulses and to condition the flip-flop to reverse the conditions of the switch means responsive to the absence of fault pulses.

Referring to the drawings in detail, FIGS. 1a and 1b show schematically the overall circuit. In FIG. 1a a low voltage detector 10, high voltage detector 12 and the high and low frequency detector 14 are shown in block form. The low voltage and high voltage detectors 10 and 12 are connected as indicated by the arrows identified by $\phi_A$, $\phi_B$ and $\phi_C$ to monitor separately the three phases of the $3\phi$ normal generator source indicated in FIG. 1b. Line transformers (not shown) reduce voltage to transistor circuit operating levels and provide isolation to permit common grounding. Each phase is rectified full wave as will be explained hereinafter and compared to D.C. reference levels 16 and 18, respectively of the low and high voltage detectors. Each reference voltage 16 is obtained from an associated gate 20, 22 and 24 in turn supplied with a reference voltage indicated and a voltage identified as A. The high voltage detector reference voltage 18 is obtained from gates 26, 28 and 30, which are each supplied with a reference voltage indicated and a voltage indicated as B.

The reason for the gates 20, 22, 24, 26, 28 and 30 and the voltages A and B will be explained hereinafter in a detailed description of the voltage detector circuits.

In the frequency detector only one phase is monitored as indicated by the arrow $\phi_A$. Reference voltages A and B are supplied to the frequency detector circuit as indicated and the reason therefor will be explained in detail hereinafter in a description of the frequency detector.

For the moment in describing the overall circuit, let it be assumed that upon the occurrence of a fault in the normal generator source a series of continuous fault pulses are transmitted as follows:

For a low voltage fault a series of fault pulses are transmitted through lines 32 and 34 and through pulse former 36 and line 38 to OR gate 40. For a high frequency fault condition, a series of pulses is transmitted through line 42, line 34, pulse former 36 and line 38 to the OR gate 40. Upon a high voltage fault condition, a series of pulses is transmitted through line 44, line 46, pulse expander monostable 48 and line 50 to the OR gate 40. Upon a low frequency fault condition, a series of pulses is transmitted through line 52, line 46, pulse expander 48 and line 50 to the OR circuit 40. The OR circuit 40 through its diodes 54 and 56 transmits the pulse signals by lines 58 and 60 and by lines 58 and 62 respectively, to a differentiator circuit 64 and an integrator circuit 66.

The output of differentiator 64 is connected by line 68 to one side of a flip-flop circuit 70. The output of integrator circuit 66 is connected by line 72 to the other side of the flip-flop circuit.

The flip-flop circuit 70 includes two output lines 74 and 76 on which voltage is to be varied responsive to a fault condition of the normal generator source to switch generators as will be described.

The flip-flop circuit 70 is per se a conventional bistable device comprising a pair of transistors 84 and 86 connected through suitable resistances between a reference voltage source 82 and a ground indicated. The bases of the transistors 84 and 86 are connected respectively to differentiator output line 68 and integrator output line 72 to selectively trigger the transistors 84 and 86 responsive to the voltage levels on lines 68 and 72 and thereby to vary the voltage levels on the flip-flop output lines 74 and 76.

Differentiator 64 is provided to condition the flip-flop 70 to provide a relative high voltage level on line 74 and a relatively low voltage on line 76 responsive to fault pulse signals from the OR gate 40.

To accomplish the above differentiator 64 comprises a transistor 90 having its emitter grounded as indicated and its collector connected through a resistor 92 to a reference voltage source 94 together with a capacitor 100 having one side connected to the collector of transistor 90 and its other side connected through a diode 96 to line 68 and through a resistor to ground, as indicated. The base of transistor 90 is connected through a resistance 91 to line 60 and through a resistor 93 to ground indicated.

In operation fault pulses from OR gate 40 condition the transistor 90 to pass current to ground, then discharging the capacitor 100 to draw current through diode 96 and lower the voltage on line 68.

Thus responsive to fault pulses from the OR gate 40, the voltage on line 68 is lowered interrupting the passage of current through the transistor 84 of flip-flop 70 to provide a relatively high voltage on line 74.

The time delay integrator circuit 66 is provided to lower the voltage level on line 76 responsive to lack of fault pulse from OR gate 40 and to raise the voltage level on line 76 responsive to fault pulses from the OR gate 40 by controlling the condition of flip-flop transistor 86 through the integrator output line 72.

To accomplish the above the integrator 66 is provided with a silicon control rectifier 102 having its anode connected through a resistor 107 to a reference voltage source 106, its cathode connected to ground indicated and its grid connected through resistor 108 to line 62 and through resistor 109 to ground indicated such that the current passing condition of SCR 102 may be controlled by the voltage on line 62. Integrator 66 also includes a capacitor 116 connected between the anode of SCR 102 and ground indicated, a transistor 112 having its collector connected through a resistor 113 to reference voltage source 106 and its cathode grounded as indicated. The base of transistor 112 is connected through a Zener diode 110 to the ungrounded side of capacitor 116 to condition the transistor 112 to pass current responsive to a predetermined charged condition of capacitor 116. The collector of transistor 112 is connected through a capacitor 118 and diode 114 to line 72 controlling the transistor 86 of flip-flop 70.

In operation of the integrator circuit 66, a fault pulse from OR gate 40 on line 62 biases the SCR 102 to pass current thus discharging the capacitor 116 such that voltage is not sufficient to pass the Zener diode 110. Thus the transistor 112 is in current interrupting condition and the voltage on line 72 is sufficiently high to bias the flip-flop 70 transistor 86 to current passing condition, thereby lowering the voltage on the flip-flop output line 76.

Upon lack of fault signal from OR gate 40 the reverse conditions take place. That is SCR 102 is in current interruption condition, capacitor 116 progressively charges to a peak voltage sufficient to pass Zenor diode 110, transistor 112 is thus conditioned to pass current discharging capacitor 118 to lower voltage on line 72 and thereby interrupting current in transistor 86 of flip-flop 70 and raising the level of voltage on output line 76 of the flip-flop.

As shown in FIG. 1b, the normal generator source indicated is connected to the load mains 120 by an SCR switch means 122 and the alternate generator source indicated is connected to the load mains by an SCR switch means 124. It is to be understood that any high speed electronic switch means can be used for switching including thyratron tubes.

Switching control of SCR 122 is obtained from the voltage on line 74 through a switching control circuit including a zero crossover pulse former 126 electrically energized from the normal generator source through lines 128, 130 and 132, a gate with time delay 134 and a power amplifier 136.

Switching control of SCR 124 is obtained from voltage on line 76 through a switching control circuit including a zero cross over pulse former 138 electrically energized from the alternate generator source through lines 140, 142, and 144, a gate with time delay 146 and a power amplifier 148.

Since the control circuit for SCR switch 124 is the same as the control circuit for SCR 122, details of circuits 126, 134 and 136 only have been shown in FIG. 1b. Also, since circuits of the type shown in controls 126, 134 and 136 are conventional per se, a brief description of their function in relation to applicants' overall control circuit should suffice.

Briefly stated, the pulse former 126 monitors all three phases of the normal generator source, rectifiers the current of each phase to produce two pulses per cycle per phase or a total of six pulses per cycle on output line 150 of the pulse former 126. Also the elements of the pulse former are selected such that the length of each pulse is about 55 degrees of the 60 degrees between zero crossover points. This is done to provide for phase shift and at the same time provide the necessary cut-off between pulses.

The pulses as above described and a direct current voltage from line 74 are supplied as inputs to the gate 134. It will be recalled that line 74 is supplied with a relatively high voltage for one condition of the flip-flop 70 and a relatively low voltage from the opposite condtion of flip-flop 70. Gate 134 through its output line 152 triggers power amplifier 136 with pulse signals when the voltage on line 74 is high. The power amplifier in turn through lines 154 and 156 energizes a primary coil 158 of the SCR 122 from a voltage reference source 153 to operate the SCR switch to closed current passing condition. The SCR 122 includes rectifier elements 160 in back-to-back arrangement in each phase line, the anode voltage being controlled from pulses received from the primary coil 158.

Thus, when the voltage of line 74 is relatively high, the SCR 122 is conditioned to pass current from the normal generator source to the load mains 120. When the voltage on line 74 is relatively low the gate 134 is not triggered, the SCR switch primary coil is not energized and the SCR switch 122 is maintained in open condition.

The control circuit, elements 138, 146 and 148, of the SCR 124 operates in response to voltage level in line 76 in the same manner as described for the control circuit of SCR 122. That is, when the voltage level in line 76 is relatively high, SCR switch 124 is closed and current is passed from the alternate generator source to the load mains 120, and when the voltage level in line 76 is low, the SCR 124 is maintained in open condition.

Consider now the operation of the overall system under the condition of normal voltage and frequency of the normal generator source. Under this normal condition there is no output from the fault voltage or frequency detectors and no fault pulse on the output line 58 of the OR gate 40. In the absence of a voltage pulse on line 62, integrator 66 is activated to condition the flip-flop 70 to that condition in which the voltage level on line 74 is relatively high and the voltage level on line 76 is relatively low. The high voltage on line 74 closes SCR 122 to connect the normal generator source to the line mains 120. The relatively low voltage level on line 76 provides no means for closing the SCR switch 124 and the alternate generator source remains disconnected from the load mains 120. Let us consider next the operation of the system under a fault condition of abnormally high or low voltage condition or abnormally high or low frequency generator source.

Under any such fault condition, a series of fault pulses is produced on line 58 from the OR gate 40. The result of the fault pulses applied to the integrator 66 and the differentiator 64 is to reverse the condition of flip-flop 70 to lower the voltage on line 74 to its relatively low value and to raise the voltage on line 76 to its relatively high value. Relatively low voltage on line 74 removes the ON bias from SCR 122 and allows the SCR 122 to immediately disconnect the load mains 120 from the normal generator source. The relatively high voltage on line 76 establishes an ON bias to the SCR 124 through its control circuit including elements 138, 146, and 148 to close SCR 124 and connect the load mains 120 to the alternate generator source. However, the delay provided in gate 146 prevents connecting the alternate supply source to the line mains until the normal supply source is disconnected. A time delay of 1.5 milliseconds has been found satisfactory in application to a 400 cycle supply.

Assuming now that the fault in the normal generator source is corrected, the fault pulse in line 58 is thereby eliminated. However, the flip-flop 70 is returned to its normal state to transfer the load lines back to the normal load source only after a time delay provided by the time delay built into the integrator circuit 66. More particularly, when the fault in the normal generator source is removed, the output or OR 40 becomes zero, permitting the integrator 66 output to increase steadily, as capacitor 118 is charging to a point where after one second the signal on line 72 operates the flip-flop 70 to its normal state. The reason for this delay is to allow the normal generator source to become stable and avoid possible recycling. The delay in integrator 66 is adjustable in accordance to the voltage level applied to delay signal line 71. The delay in gate 134 provides the time delay in reconnecting the normal generator source which is desirable to provide time for disconnecting the alternate generator.

The system as thus far described contemplates the disconnection and reconnection of the normal generator source in relation to one fixed range of voltage tolerance and one fixed range of frequency tolerance.

A description disclosing the details of the fault detection circuits and means for varying the fault tolerances such that reconnection of the normal generator source requires conditions of more limited fault tolerance are included in our copending applications for High-low Voltage Amplitude Monitor and Frequency Error Detector for a Power Supply Monitor and Bus Transfer Switch, and bearing Ser. Nos. 449,661 and 449,662, respectively.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A condition responsive electronic control for automatically switching load mains from a normal generator source to an alternate generator source responsive to deviations in voltage and frequency of said normal source from predetermined normal voltage and frequency ranges comprising:
   means including voltage and frequency detection circuits convertible to said normal source for sensing said deviations and for developing responsive to said deviations electrical pulse signals,
   a first electronic condition responsive control switch means for connection between said normal source and said load mains to connect and disconnect said normal source and said load mains responsive to control conditions on said first mains,
   a second electronic condition responsive control switch means for connection between said alternate source and said load mains to connect and disconnect said alternate source and load mains responsive to control condition on said second mains,
   means including an OR gate connected to receive said pulse signals and a differentiation network and flip-flop circuit connected in series between said OR gate and each of said switch means to condition said first switch means to interrupt the passage of current therethrough to said power mains and to condition said second switch means to pass current to said power mains.

2. A control as set forth in claim 1, including means for reversing the condition at each of said switch means upon the return of said normal source to normal voltage and frequency range to disconnect said load mains from said alternate source and to transfer said load mains back to said normal source.

3. A control as set forth in claim 2, said condition reversing means including an integrating circuit connected between said OR gate and said flip-flop circuit and responsive to the failure of pulse signal from said OR gate.

4. A control as set forth in claim 3, said voltage detection circuits including gate means connected to a fixed reference voltage means and to the output of said flip-flop circuit to reduce the normal voltage range tolerance through which said voltage detection circuits will provide a pulse signal from which said switch means are conditioned for reconnection of said load mains to said normal source.

5. A control circuit as set forth in claim 3, said frequency detection circuit including a counter and logic system to measure frequency, means for reset of the counter responsive to actual frequency of said normal source current, said logic system being connected to the output voltage of said flip-flop circuit to vary the setting of said logic system to reduce frequency range at which said frequency detection circuit will provide an electrical pulse signal to said OR circuit to condition said switch means for normal operation of said load mains from said normal source.

6. A condition responsive electronic control for automatically switching load mains from a normal generator source to an alternate generator source responsive to deviation in voltage and frequency from predetermined normal voltage and frequency ranges and for automatically disconnecting said alternate source and reconnecting said load mains to said normal source upon elimination of the deviation comprising:
   means including voltage and frequency detection circuits for sensing said deviations and for developing resonance to said deviation electrical pulse signals,
   SCR means for connection between said normal source and said load mains to connect and disconnect said normal source and said load mains responsive to electrical signals received thereby,
   SCR means for connection between the alternate source and said load mains to connect and disconnect said alternate source and load mains responsive to electrical signals received thereby,
   means including an OR gate connected to receive electrical signals from said detector circuits, and a differentiation network and flip-flop circuit connected in series between said OR gate and each of said SCR means to operate said SCR means to switch said load mains from said normal source to said alternate source responsive to said voltage and frequency deviations,
   and an interacting circuit connected between said OR gate and said flip-flop circuit to operate said SCR means to switch said load mains back to said normal source and to disconnect said alternate source responsive to return of said normal source to normal frequency and voltage range.

References Cited

UNITED STATES PATENTS

| | | | |
|---|---|---|---|
| 1,859,069 | 5/1932 | Beekman | 307—64 |
| 3,069,556 | 12/1962 | Apfelbeck | 307—87 |
| 3,201,592 | 8/1965 | Reinert | 307—64 |
| 3,243,658 | 3/1966 | Blackburn | 317—31 |
| 3,277,307 | 10/1966 | Smeton | 307—64 |

ORIS L. RADER, *Primary Examiner.*

T. J. MADDEN, *Assistant Examiner.*